July 8, 1924.

H. W. SPOONER

CONVEYER SYSTEM

Filed Jan. 10, 1921   5 Sheets-Sheet 2

1,500,776

INVENTOR
HENRY W. SPOONER
BY
D. Anthony Usina ATTORNEY

July 8, 1924. 1,500,776
H. W. SPOONER
CONVEYER SYSTEM
Filed Jan. 10, 1921  5 Sheets-Sheet 3
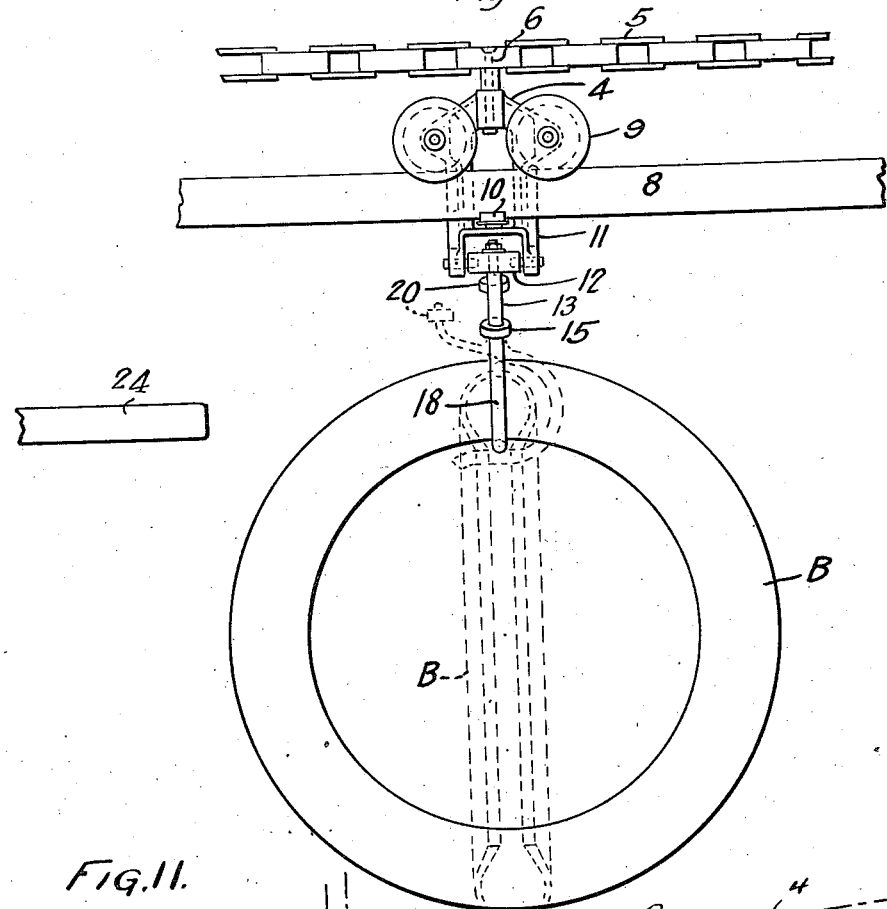
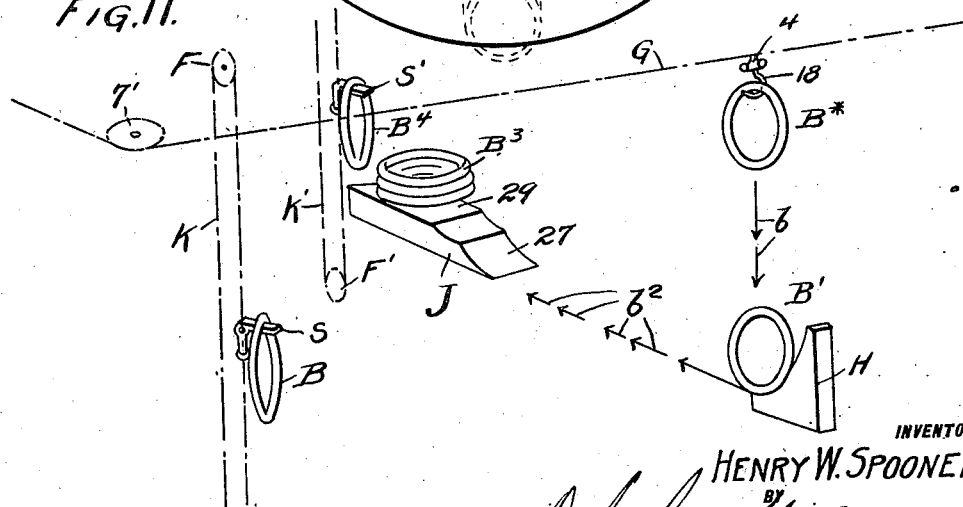
INVENTOR
HENRY W. SPOONER
BY
ATTORNEY July 8, 1924.

H. W. SPOONER

CONVEYER SYSTEM

Filed Jan. 10, 1921

INVENTOR
HENRY W. SPOONER
BY
ATTORNEY

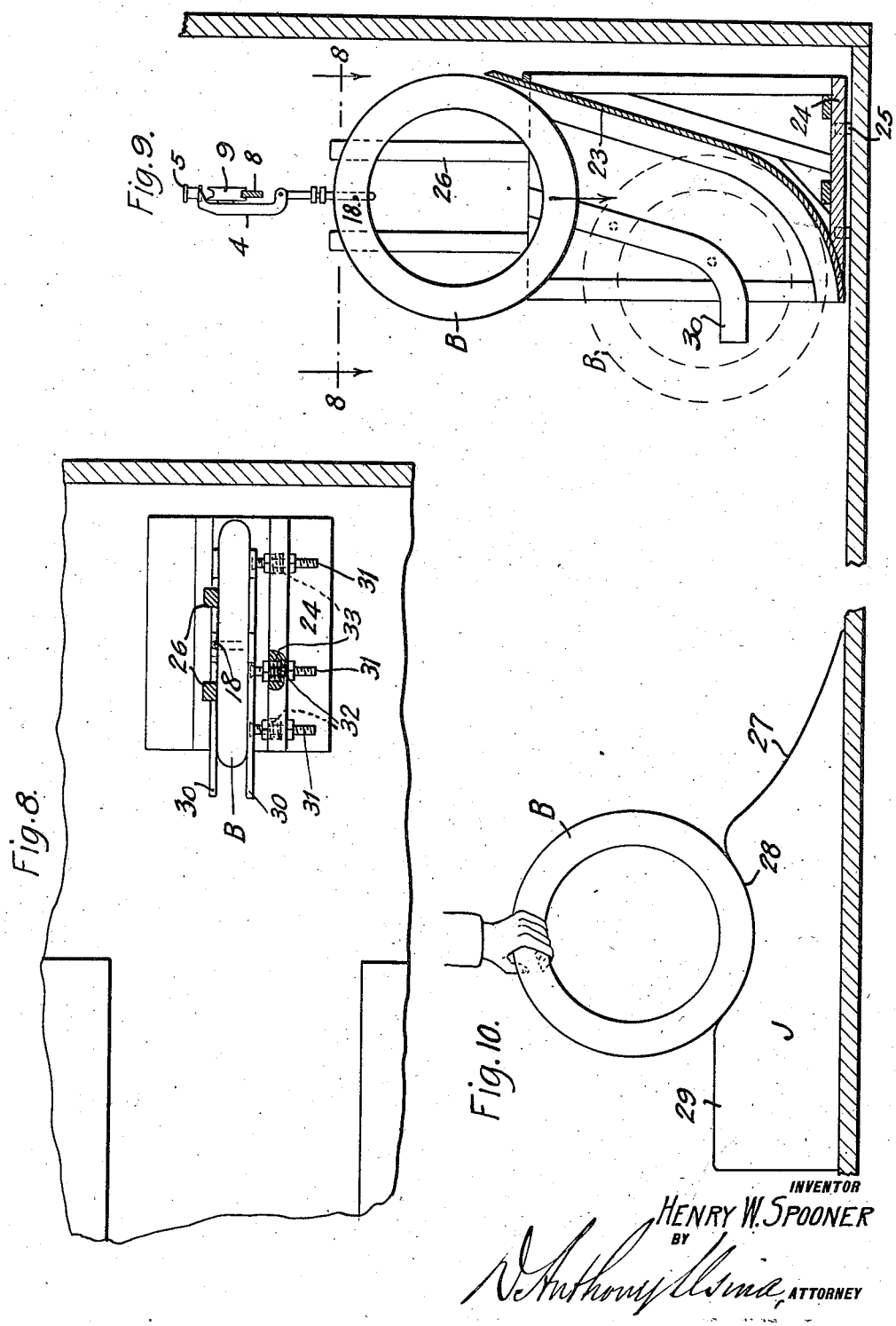

Patented July 8, 1924.

1,500,776

UNITED STATES PATENT OFFICE.

HENRY W. SPOONER, OF BROOKLYN, NEW YORK.

CONVEYER SYSTEM.

Application filed January 10 1921. Serial No. 436,047.

*To all whom it may concern:*

Be it known that I, HENRY W. SPOONER, a citizen of the United States, residing in the borough of Brooklyn, city of New York, State of New York, have invented certain new and useful Improvements in Conveyer Systems, of which the following is a specification.

In the manufacture of automobile tires it is generally the custom to store them in a warehouse from day to day as they are manufactured. My invention provides a conveyer system adapted to transfer such tires and similar annular or cylindrical articles from the point of manufacture to the aisles of a storage warehouse or to other points where they are to be delivered. It may be used also for handling beef, pork, and any commodities which are attached to a ring and transported from one point to another; also for handling coils of wire, barrel hoops, steel tires, rims and similar ring-shaped articles which can be hung on a hook.

The accompanying drawings illustrate an embodiment of the invention.

Fig. 5 is a side elevation of a trolley;

Fig. 8 is a plan of the discharging apparatus and Fig. 9 is a transverse section of the same;

Fig. 10 is a side elevation of a stopping block.

Fig. 11 is a diagrammatic view showing an arrangement whereby the tires may be transferred from one horizontal conveyer to an elevator adapted to carry them to another horizontal conveyer.

Figure 1:
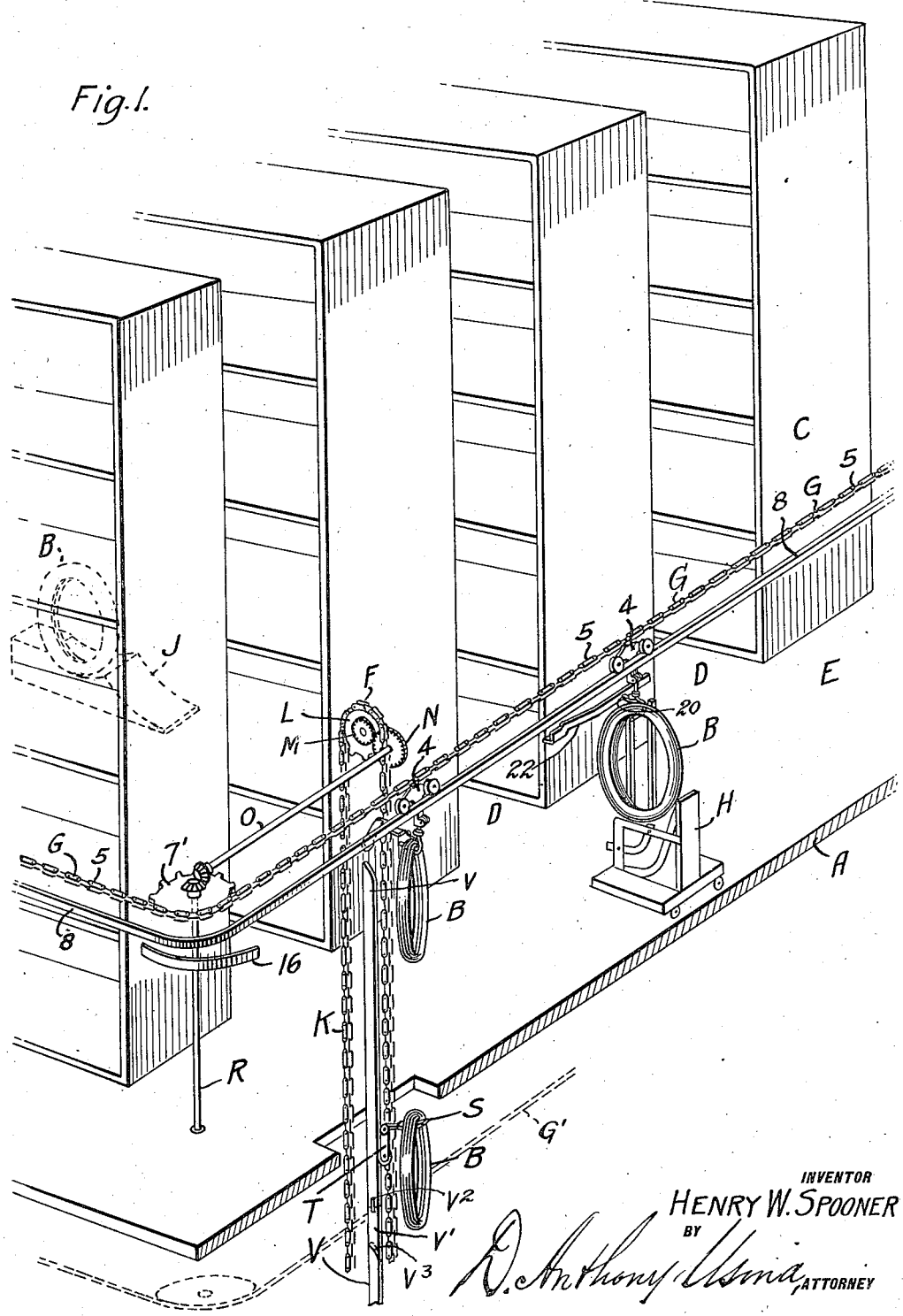
Fig. 1 is an isometric diagram of a tire conveyer system embodying the invention.

Referring to Fig. 1, A is one of the upper floors of a warehouse on which the tires B are to be stored. C are racks with aisles D between and giving access to them and opening at opposite ends into side aisles E.

An elevator indicated generally at F brings the tires from a lower floor up to the level of the floor where they are to be stored. From this elevator they are transferred to a horizontal or approximately horizontal carrier G, which conveys them along the side aisle E past the lines of the several aisles D leading to the racks. A discharging apparatus H takes the tires in succession from the horizontal carrier and rolls them along the floor of the aisle; whence they may be taken by the workmen and placed in the racks; or they may be rolled along the aisle to a receiving block J which stops them in convenient position for the operator to place them in the racks.

Each floor may be provided with a horizontal carrier G running around the periphery of it, though generally such an arrangement will be unnecessary on the ground floor. And in the case of floors of large area, they may be divided into sections around each of which is a separate horizontal carrier. Likewise a number of elevators F may be arranged in position to fit horizontal carriers on the different floors and on different sections of each floor.

The discharging apparatus H may be adjustable so that it can be located at will in line with any one of the aisles D. Or a number of such apparatus H may be used, each located in line with one of the aisles D and adjustable to operative or inoperative position so as to discharge the tires in the desired aisle. In fact, the separate parts of the apparatus may be arranged in a variety of ways and multiplied according to the circumstances of the case. Also the sizes and proportions of the several parts of the apparatus may be altered to suit the sizes and the number of tires to be handled.

The elevator F is an endless chain K running at its upper end over a sprocket wheel L, and at its lower end over a similar sprocket. The driving sprocket L is operated through a pinion M and a gear N on a shaft O carrying a bevel gear P driven by a bevel gear Q on a vertical shaft R. The chain K (Fig. 3) carries hooks S at equal intervals of its length and extending outward therefrom; each hook S being mounted on one of the pins of the chain, and having a depending arm T at the lower end of which is a roller U adapted to bear against a stationary guide V terminating just below the point where the tire is to be transferred to the horizontal carrier. This arrangement maintains the tire hook S in a horizontal position in which it engages the inner edge of a tire B and sustains the latter clear on the outside of the chain until the roller U reaches the end or an interrupted portion of the guide V. On the side of the arm S is an arc shaped lateral extension X with a slot engaging a laterally extending pin on the chain and limiting the travel of the arm T. When the chain carries the hook above the point indicated in Fig. 3, the roller U escapes from the guide V and the hook drops to the full line position and allows the tire to slide off.

As before stated there may be a horizontal conveyer G at each floor or at different levels. In such a case the guide V will be provided with a removable portion $V^1$ so as to allow the roller U on the arm T of the hook S to swing inward and thereby discharge the tire B to the conveyer $G^1$ for example as shown in the dotted lines in Fig. 1. The removable portion $V^1$ may be detachably secured to the guide V in any suitable manner for example by means of a clip $V^2$ it being apparent that when the portion $V^1$ is removed the roller U will ride inward along the cam end $V^3$ of the guide V.

Figure 4:
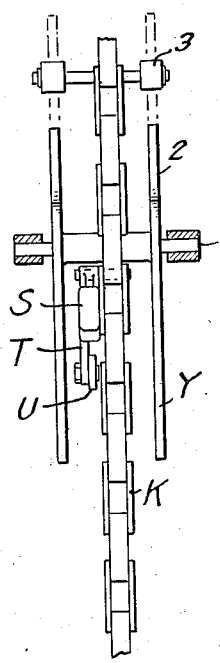
Fig. 4 is a front elevation of part of the elevator.

For guiding the tire on to the hook of the horizontal carrier I provide a pair of guide bars Y mounted at a fixed elevation on a pivot Z (Fig. 4) and straddling the chain and hooks but sufficiently close together to pass through the center of the tire, and normally standing in the position shown in full lines. These bars are provided with tails 2 which, as the chain travels upward are engaged by rollers 3 extending laterally from the chain at points shortly above the hook S. The continued movement of the chain swings the guide bars Y to the dotted line position shown and holds them there until the hook S has dropped; so that the tire is lowered on to the inclined guides Y and will slide down and off their ends.

Figure 3:
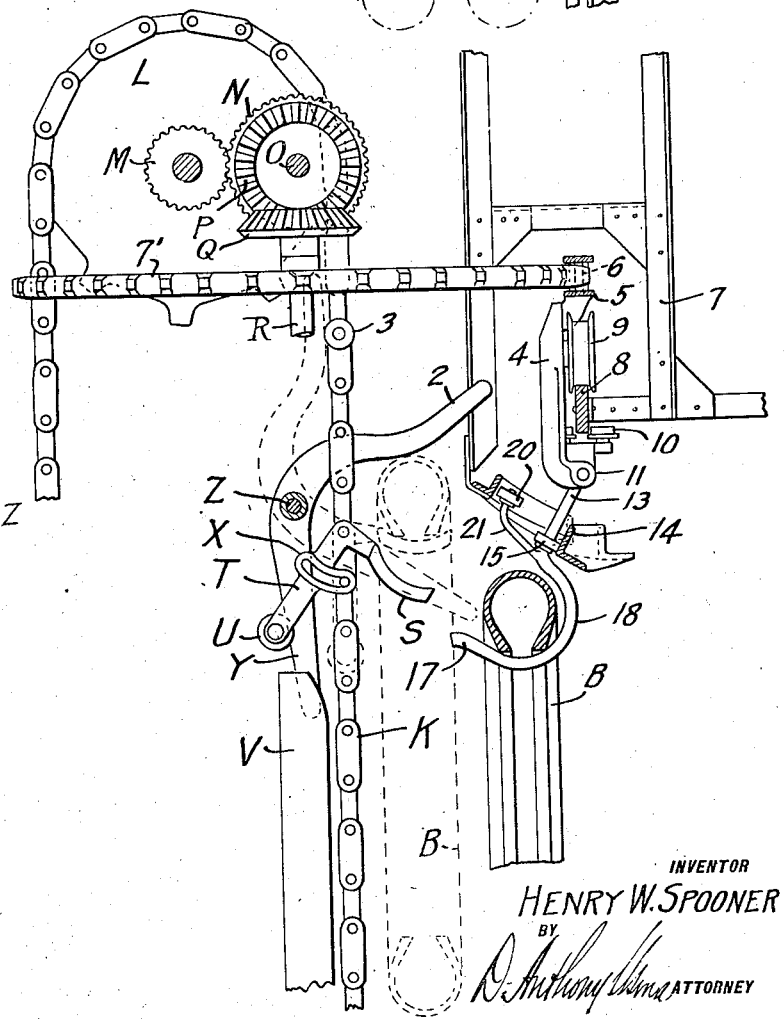
Figures 6, 7:
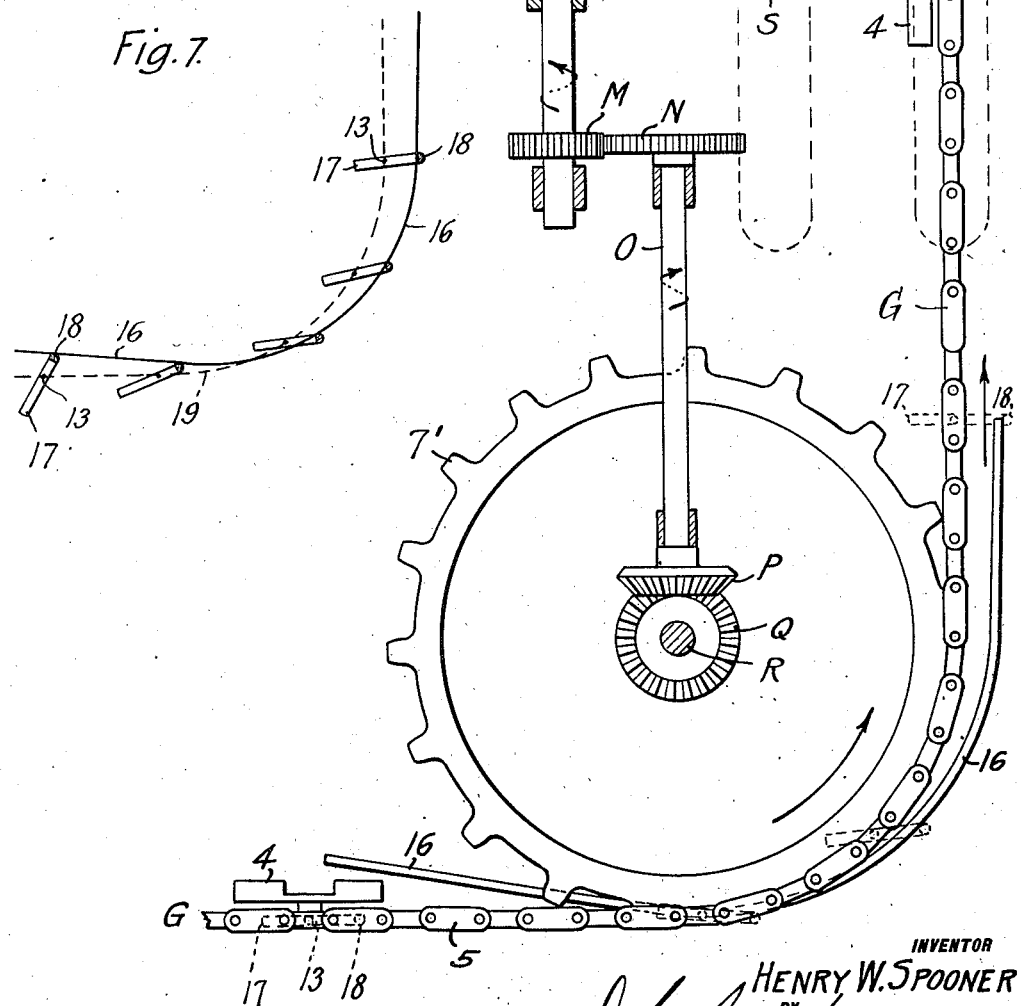
Fig. 6 is a top plan of the connection between the elevator and the horizontal carrier.
Fig. 7 is a diagram of a part of Fig. 6.

The horizontal carrier designated as a whole by the letter G comprises a succession of trolleys 4 (Figs. 3 and 5) drawn by a chain 5 with depending pins 6 engaging the trolleys and traveling around sprocket wheels 7' at the corners of the storage section or wherever a turn is made in the direction of the carrier. Each trolley carriers a hook to which a tire is to be transferred from the elevator when the horizontal carrier hook comes into register with an elevator hook S. The spacing of the hooks on the horizontal carrier and on the elevator respectively determines the rate of travel of the two apparatus and the driving mechanism must be such as to synchronize the respective rates of travel. This may be accomplished, for example, as indicated in Figs. 3 and 6 and described above. If the hooks on the two carriers are arranged at the same intervals the gearing will be such as to drive the two chains at the same speed. Or the hooks on the horizontal carrier may be arranged closer together, in which case its speed will be correspondingly slower than that of the elevator.

A rigid frame 7, suspended from the ceiling and fastened to the side wall of the building carriers a rail 8 on which the rollers 9 of the trolley are supported, and the lower edge of which guides the trolley through horizontal rollers 10.

The lower end of the trolley terminates in lugs 11 between which is trunnioned a cross bar 12 (Fig. 5) through which passes the shank 13 of the hook, the shank 13 being arranged to turn in the block 12 so as to hold the hook in a position transverse to its line of travel or in a position parallel thereto. The chain 5 may be provided with any usual or additional supports from overhead between the corner sprockets 7.

Figure 2:
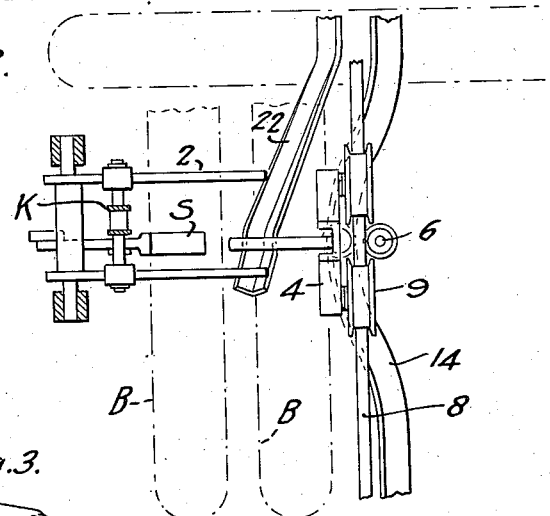
Figs. 2 and 3 are respectively a plan and elevation of a part of the system where the tires are transferred from an elevator of a horizontal conveyer.

A cam guide 14 is supported from the wall or from any other fixed support and extends a short distance on either side of the elevator, as shown in Fig. 2 and is shaped to engage a roller 15 on the lower end of the shank of the hook and to swing the latter toward the elevator in position to receive a tire sliding off the ends of the guide bars Y.

To ensure that the open side or jaw of the hook shall face toward the elevator at the moment of transfer an additional guide rod or cam 16 (Figs. 6 and 7) is provided, fastened rigidly to the supports and adapted to deflect the hook into proper position as it travels toward the transverse station. The open end of each hook is marked 17. The intermediate portion 18 is bent backward so that in plan view, Fig. 7, the stem 13 approximately comes half way between bow 18 of the hook and its point 17. The path of the point 13 is indicated by the dotted line 19. The cam 16 commences at the inner side of the path and swings across the same to the outer side thereof. Now if the hook lies in a transverse position with its bow 18 at one side of the path of movement, it will strike the cam 16 and will be deflected forward and across the path of travel as shown by the successive positions so that as it leaves the cam 16 it will stand properly at right angles to the line of travel, which is the position necessary for receiving a tire.

After the tire is transferred to the hook 17 the shape of the cam 14 permits it to swing back to its normal position with its shank substantially vertical. Also as soon as the transfer is accomplished a second guide roller 20 arranged on an arm 21 of the shank comes in contact with a third cam 22 supported by the framework which carries the trolley rail and shaped as shown in Fig. 2 to gradually retard the forward movement of the roller 20 and to swing it back behind the roller 15 so as to bring the open bight of the hook to the rear of its direction of travel; the shank 13 of the hook turning in the supporting block 12. The hook is thus given a quarter turn and thereafter holds this position naturally. The tire now hangs crosswise of the carrier or parallel to the aisles D of Fig. 1, unless turned by hand or accidentally; and in any case will reassume this position on striking the discharging mechanism.

The discharging apparatus is illustrated in detail in Figs. 8 and 9. It comprises a curved chute 23 mounted in a carriage 24 which may be on rollers 25 so that it may be transferred to the ends of the several cross aisles, and having a pair of posts 26 projecting upward in position to be struck by the tire B as the trolley moves the latter along the side aisle. When the tire strikes the posts 26 it stops and the trolley moves along and withdraws the hook from engagement. The tire then drops into the chute 23 which is of just sufficient width to hold the tire upright on edge and to start it rolling along the aisle. This rolling operation will carry the tire practically any desired distance. In the case of light tires the workman can stop them wherever he is filling the racks. In the case of heavy tires, however, it is advisable to use a stopping block such as I have indicated in Fig. 10.

The stopping block, Fig. 10, has a forward end with a gradual upwardly inclined face 27 at the rear of which is a hollow surface 28; and it may be further extended to the rear to form a slightly elevated platform 29 on which the workman may stand. The tire B will have sufficient momentum to roll up the slope 27 and come to rest in the hollow seat 28, whence it may readily be lifted into the rack by the workman on the platform 29.

The invention makes it possible to handle and store tires with great rapidity and economy and without labor from the time they are put on the elevator until they are delivered to the workman at the racks. The same apparatus may be utilized for conveying tires or other articles between other points than the factory and warehouse referred to.

The discharging apparatus or chute 23 may be provided with a brake to prevent its rolling sidewise, or it may be arranged to permit lifting of its wheels so that it will rest solidly on the floor. Or there may be one or a number of such chutes in fixed locations. The side pieces 30 are used as lateral guides, forming practically parts of the chute and they may be laterally adjustable by means of bolts 31 and the springs 32 seated in socket 33 so as to have a greater or less braking effect to prevent the tire's rolling too far, or to take care of wider or narrower tires.

The various parts of the complete equipment shown may be used separately or in other combinations. For example as shown in Fig. 11 the tires B may be elevated by the chain K transferred to the horizontal conveyer G where they are carried horizontally in much the same manner as above described to the position indicated at B* where they are released and caused to fall to the position $B^1$ to the discharging apparatus H whereupon the tire will roll in the direction of the arrows $b^2$ to the stopping block J where it will roll up the inclined face 27. The tires may then be stored on a platform 29 from which position they can be transferred to another elevator $K^1$ driven by a suitable sprocket wheel $F^1$, the tires being caught on this chain or elevator by laying them one after another against said elevator so that as the next hook S' comes into position the tire will be carried with it. This elevator being adapted to carry the tire $B^4$ for example to a higher floor where the tire can be again discharged to another horizontal conveyer not shown.

The term "horizontally," as applied for example to the conveyer G, is used in the broad sense as referring to a movement in a generally horizontal direction either with or without a certain vertical inclination also. And in speaking of a "transverse" direction I mean a direction which is either at right angles to or obliquely across another.

While my invention is particularly adapted for handling tires it is not to be interpreted that it is limited to such use as it is manifest that it could be used for handling articles of various kinds such as coils of wire, car wheels, piston rings, barrel hoops, etc.

Though I have described with great particularity of detail a certain specific embodiment of my invention, yet it is not to be understood therefrom that the invention is restricted to the particular embodiment disclosed. Various modifications in the details and in the arrangement of the parts may be made by those skilled in the art and various parts of the complete apparatus described may be used in other connections, without departing from the invention as defined in the following claims.

What I claim is:

1. A conveying apparatus for tires including in combination an elevator for lifting the tires in succession to a determined level, a conveyer comprising a set of hooks traveling horizontally at approximately said level, means for discharging the tires from said elevator to said hooks with the tires parallel to the line of travel of the hooks, means for turning said tires to the transverse position, and means for discharging the tires while in such position.

2. A conveying apparatus for tires including in combination an elevator for lifting the tires in succession to a determined level, a conveyer comprising a set of hooks traveling horizontally at approximately said level, means for discharging the tires from said elevator to said hooks with the tires parallel to the line of travel of the hooks, means for turning said tires to the transverse position, and means for discharging the tires while in such position, and an inclined chute for receiving the tires discharged from said hooks and rolling them in the transverse direction.

3. A conveying apparatus for tires including in combination an elevator for lifting the tires in succession to a determined level, a conveyer comprising a set of hooks traveling horizontally at approximately said level, means for shifting said hooks out of their normal position toward the elevator and means for discharging the tires from the elevator to said hooks while in such shifted position.

4. A conveying apparatus for tires including a set of hooks traveling horizontally and means for turning said hooks about a vertical axis to bring them into a desired plane for receiving the tires.

5. A conveying apparatus for tires including in combination a conveyer comprising a set of hooks traveling horizontally and means for turning said hooks about a vertical axis to bring the tires to a position transverse to the line of travel.

6. A conveying apparatus for tires including in combination an elevator for lifting the tires in succession to a determined level and comprising a set of hooks, means for tripping said hooks to discharge the tires at any desired level and means for engaging the tires when the hooks are tripped and guiding the tires to a point away from the conveyer.

7. A conveying apparatus for tires comprising in combination a conveyer, comprising a set of hooks traveling horizontally, means for causing the hooks to drop the tires and a chute which receives the tires from such hooks and rolls them to a desired point.

8. A conveying apparatus for tires including, a chute which receives tires from a conveyer and rolls them to a desired point and a stopping block for receiving a rolling tire, said block having a slope up which the tire will roll and by which its momentum will be reduced.

9. A conveying apparatus for tires including in combination an elevator for lifting the tires in succession to a determined level, a conveyer traveling horizontally at approximately said level, means for discharging the tires from said elevator to said conveyer with the tires parallel to the line of travel of the latter, means for turning said tires to the transverse position and means for discharging the tires while in such transverse position.

10. A conveying apparatus for tires including in combination an elevator for lifting the tires in succession to a determined level, a conveyer traveling horizontally at approximately said level, means for discharging the tires from said elevator to said conveyer with the tires parellel to the line of travel of the latter, means for turning said tires to the transverse position and means for discharging the tires while in such transverse position, and an inclined chute for receiving the tires discharged from said conveyer and rolling them in a transverse direction.

11. A conveying apparatus for tires including in combination an elevator for lifting the tires in succession to determined levels, a conveyer comprising a set of hooks traveling horizontally at approximately each level and means for discharging the tires from said elevator to said hooks.

12. A conveying apparatus for tires including in combination an elevator for lifting the tires to different levels, conveyers comprising a set of hooks traveling horizontally at approximately each of said levels, means for discharging the tires from said elevator to said hooks at any of the different levels and means for operating said elevator and said conveyers synchronously so as to discharge the successive tires from the elevator as the successive hooks come into register therewith.

13. A conveying apparatus for tires including in combination an elevator adapted to lift the tires to different determined levels and means for discharging a tire from said elevator at a given level including a transfer member adapted to be deflected into the opening within the tire to deflect the latter out of its line of travel on the elevator.

14. A conveying apparatus for substantially circular articles comprising in combination a conveyer, comprising a set of hooks traveling horizontally, means for causing the hooks to drop the articles and a chute which receives the articles from such hooks and rolls them to a desired point and means for retarding the rolling speed of the article.

15. A conveying apparatus for tires including in combination an elevator for lifting the tires in succession to a determined level, a conveyer traveling horizontally at approximately said level, means for discharging the tires from said elevator to said conveyer with the tires parallel to the line of travel of the latter, means for turning said tires to the transverse position and means for discharging the tires while in such transverse position, and an inclined chute for receiving the tires discharged from said hook and rolling them in a transverse direction, and a stopping block for receiving said tires and having a slope up which the tire will roll and by which its momentum will be reduced.

16. A conveying apparatus for tires comprising in combination a horizontal conveyer, means for causing the tires to drop from said conveyer, a chute which receives the tires from said conveyer and rolls them to a desired point and a stopping block for receiving a rolling tire, said block having a slope up which the tire will roll and by which its momentum will be reduced.

In witness whereof, I have hereunto signed my name.

HENRY W. SPOONER.